(12) United States Patent
Hoffman et al.

(10) Patent No.: US 8,964,297 B2
(45) Date of Patent: *Feb. 24, 2015

(54) THIN FILM HIGH DEFINITION DIMENSIONAL IMAGE DISPLAY DEVICE AND METHODS OF MAKING SAME

(71) Applicant: Travel Tags, Inc., North Mankato, MN (US)

(72) Inventors: Anthony L. Hoffman, Eagan, MN (US); John Tomczyk, Shoreview, MN (US); Lee A. Timmerman, Madison Lake, MN (US); Lane H. Gravley, Mankato, MN (US); Chad M. Ratcliff, Mankato, MN (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,205

(22) Filed: Dec. 10, 2012

(65) Prior Publication Data

US 2013/0094789 A1    Apr. 18, 2013

Related U.S. Application Data

(63) Continuation-in-part of application No. 12/562,795, filed on Sep. 18, 2009, now Pat. No. 8,331,031.

(60) Provisional application No. 61/098,172, filed on Sep. 18, 2008, provisional application No. 61/223,882, filed on Jul. 8, 2009.

(51) Int. Cl.
*G02B 27/10* (2006.01)
*G03B 21/60* (2014.01)
(Continued)

(52) U.S. Cl.
CPC ............... *B65D 33/04* (2013.01); *G02B 3/005* (2013.01); *G02B 3/0062* (2013.01); *G02B 27/2214* (2013.01); *G02B 27/06* (2013.01); *G02B 27/2221* (2013.01); *B42D 25/324* (2014.10)
USPC ............................ 359/621; 359/454; 359/626

(58) Field of Classification Search
USPC ......... 359/618–621, 625–626, 443, 454–455; 264/1.1, 1.32, 2.7
See application file for complete search history.

(56) References Cited

U.S. PATENT DOCUMENTS 3,503,315 A    3/1970   Montebello
3,725,184 A    4/1973   Scopp
(Continued)

FOREIGN PATENT DOCUMENTS

CN    2719578 Y    8/2005
FR    2551559       3/1985
(Continued)

OTHER PUBLICATIONS

Swientek, "Lenticular Labels Add 'Motion' to Static Products on Shelves", BrandPackaging, Mar. 2002, pp. 22-24.
(Continued)

*Primary Examiner* — Dawayne A Pinkney
(74) *Attorney, Agent, or Firm* — Patterson Thuente Pedersen, P.A.

(57) ABSTRACT

A high definition thin lens dimensional image display device and methods of manufacturing the same. The thin lens dimensional image display device generally includes a lens array on a first surface of a film, such as a lenticular lens array or a fly's eye lens array, with a printed imaged either printed directly on a second planar surface of the film, or on a separate substrate that is laminated thereto. The resulting display device offers a lower cost display device having greater flexibility for a wider variety of applications than traditional image display devices, without compromising image quality. Processes for manufacturing the display device include printing on a pre-fabricated thin lens web, inline printing of an image and patterning of the lens array, and inline printing of a substrate and application of a coating to the substrate which is subsequently patterned or embossed.

20 Claims, 10 Drawing Sheets

(51) Int. Cl.
*B65D 33/04* (2006.01)
*G02B 3/00* (2006.01)
*G02B 27/22* (2006.01)
*G02B 27/06* (2006.01)
*B42D 25/324* (2014.01)

(56) References Cited

U.S. PATENT DOCUMENTS

| | | |
|---|---|---|
| 4,414,316 A | 11/1983 | Conley |
| 4,920,039 A | 4/1990 | Fotland et al. |
| 4,935,335 A | 6/1990 | Fotland |
| 5,034,982 A | 7/1991 | Heninger et al. |
| 5,266,995 A | 11/1993 | Quadracci et al. |
| 5,285,238 A | 2/1994 | Quadracci et al. |
| 5,318,807 A | 6/1994 | Gili Picoy |
| 5,321,749 A | 6/1994 | Virga |
| 5,330,799 A | 7/1994 | Sandor et al. |
| 5,362,351 A | 11/1994 | Karszes |
| 5,457,515 A | 10/1995 | Quadracci et al. |
| 5,460,679 A | 10/1995 | Abdel-Kader |
| 5,492,578 A | 2/1996 | Morton |
| 5,554,432 A | 9/1996 | Sandor et al. |
| 5,642,226 A | 6/1997 | Rosenthal |
| 5,685,570 A | 11/1997 | Gray et al. |
| 5,753,344 A | 5/1998 | Jacobsen |
| 5,762,379 A | 6/1998 | Salmon et al. |
| 5,949,420 A | 9/1999 | Terlutter |
| 6,113,149 A | 9/2000 | Dukatz |
| 6,170,881 B1 | 1/2001 | Salmon et al. |
| 6,251,566 B1 | 6/2001 | Brosh et al. |
| 6,252,621 B1 | 6/2001 | Kessler et al. |
| 6,256,150 B1 | 7/2001 | Rosenthal |
| 6,373,636 B1 | 4/2002 | Conley |
| 6,424,323 B2 | 7/2002 | Bell et al. |
| 6,424,467 B1 | 7/2002 | Goggins |
| 6,490,092 B1 | 12/2002 | Goggins |
| 6,494,491 B1 | 12/2002 | Zeiter et al. |
| 6,596,361 B2 | 7/2003 | Klein et al. |
| 6,624,946 B2 | 9/2003 | Franko, Sr. |
| 6,751,024 B1 | 6/2004 | Rosenthal |
| 6,781,761 B2 | 8/2004 | Raymond |
| 6,784,962 B2 | 8/2004 | Sumida et al. |
| 6,795,250 B2 | 9/2004 | Johnson et al. |
| 6,833,960 B1 | 12/2004 | Scarbrough et al. |
| 6,843,009 B2 | 1/2005 | Kainen |
| 6,856,462 B1 | 2/2005 | Scarbrough et al. |
| 6,872,277 B2 | 3/2005 | Klein et al. |
| 6,900,944 B2 | 5/2005 | Tomczyk |
| 6,974,080 B1 | 12/2005 | Goggins |
| 6,989,931 B2 | 1/2006 | Rosenthal |
| 6,995,913 B2 | 2/2006 | Goggins |
| 7,001,654 B2 | 2/2006 | Kiraly et al. |
| 7,002,748 B1 | 2/2006 | Conley et al. |
| 7,048,307 B1 | 5/2006 | Scarbrough et al. |
| 7,075,725 B2 | 7/2006 | Tomczyk |
| 7,083,340 B2 | 8/2006 | Goggins |
| 7,101,437 B2 | 9/2006 | Boutilier et al. |
| 7,114,750 B1 | 10/2006 | Alasia et al. |
| 7,130,126 B1 | 10/2006 | Chung |
| 7,136,185 B2 | 11/2006 | Goggins |
| 7,149,035 B2 | 12/2006 | Goggins |
| 7,164,537 B2 | 1/2007 | Raymond |
| 7,165,959 B2 | 1/2007 | Humlicek et al. |
| 7,190,518 B1 | 3/2007 | Kleinberger et al. |
| 7,212,346 B2 | 5/2007 | Krause |
| 7,239,420 B2 | 7/2007 | Goggins |
| 7,242,525 B2 | 7/2007 | Raymond |
| 7,259,916 B2 | 8/2007 | Raymond |
| 7,290,802 B1 | 11/2007 | Scarbrough et al. |
| 7,290,803 B2 | 11/2007 | Scarbrough et al. |
| 7,304,802 B2 | 12/2007 | Raymond |
| 7,307,790 B1 | 12/2007 | Raymond |
| 7,359,120 B1 | 4/2008 | Raymond et al. |
| 7,414,790 B2 | 8/2008 | Raymond et al. |
| 7,465,369 B2 | 12/2008 | Raymond |
| 7,545,565 B2 | 6/2009 | Tomczyk |
| 7,545,566 B2 | 6/2009 | Tomczyk |
| 7,545,567 B2 | 6/2009 | Tomczyk |
| 7,576,918 B2 | 8/2009 | Goggins |
| 7,654,579 B2 | 2/2010 | Hansen |
| 2003/0108198 A1 | 6/2003 | Lahiri |
| 2004/0095648 A1 | 5/2004 | McCannel et al. |
| 2004/0096601 A1 | 5/2004 | Raymond |
| 2004/0115376 A1 | 6/2004 | Tomczyk |
| 2004/0136079 A1 | 7/2004 | Goggins |
| 2004/0263885 A1 | 12/2004 | Tomczyk |
| 2005/0156813 A1 | 7/2005 | Adachi et al. |
| 2005/0184504 A1 | 8/2005 | Alasia et al. |
| 2006/0146410 A1 | 7/2006 | Krause |
| 2006/0151993 A1 | 7/2006 | Nemeth |
| 2006/0262411 A1 | 11/2006 | Dunn et al. |
| 2006/0285215 A1 | 12/2006 | Wu |
| 2007/0058258 A1 | 3/2007 | Mather et al. |
| 2007/0132122 A1 | 6/2007 | Raymond et al. |
| 2007/0188874 A1 | 8/2007 | Robb et al. |
| 2008/0088126 A1 | 4/2008 | Hoffman et al. |
| 2008/0088931 A1 | 4/2008 | Hoffman |
| 2008/0106091 A1 | 5/2008 | Tompkin et al. |
| 2008/0129038 A1 | 6/2008 | Scarbrough |
| 2008/0165423 A1 | 7/2008 | Steenblik et al. |
| 2008/0213528 A1 | 9/2008 | Hoffman |
| 2008/0284157 A1 | 11/2008 | Muke et al. |
| 2009/0097114 A1 | 4/2009 | Mimura et al. |
| 2009/0168165 A1 | 7/2009 | Hoffman |
| 2009/0225154 A1* | 9/2009 | Raymond et al. ............... 348/51 |
| 2009/0251787 A1 | 10/2009 | Tomczyk |
| 2009/0315321 A1 | 12/2009 | Michieli et al. |
| 2010/0015403 A1 | 1/2010 | Sacks et al. |
| 2010/0018644 A1 | 1/2010 | Sacks et al. |
| 2010/0134895 A1 | 6/2010 | Hoffman et al. |
| 2010/0182666 A1 | 7/2010 | Herbert et al. |
| 2011/0261464 A1 | 10/2011 | Hoffman et al. |

FOREIGN PATENT DOCUMENTS

| | | |
|---|---|---|
| FR | 2551560 | 3/1985 |
| WO | WO 97/03826 | 2/1997 |
| WO | WO 00/63016 | 10/2000 |
| WO | WO 2004/021069 A1 | 3/2004 |
| WO | WO 2006/029745 A1 | 3/2006 |
| WO | WO 2008/042348 A1 | 4/2008 |
| WO | WO 2008/042349 A2 | 4/2008 |
| WO | WO 2008/079268 A2 | 7/2008 |

OTHER PUBLICATIONS

3M Vikuiti Films, (known to Applicants as of Oct. 2009), 2 pages.
HP Label (known to Applicants as of Oct. 2009), 1 page.
"Ground-Breaking Lenticular Flexographic Printing System Revealed at Pack Expo", PRWeb, Nov. 2008, 2 pages.
"Chromalen Technology", Pixalen Studio, Mar. 2010, 1 page.
Brochure, "3-D Images", known to Applicant at least as of May 11, 2011, 8 pages.
Web page entitled "3D Lenticular and Hologravure Packaging" by 3DZ. Web archive Jun. 21, 2006 http://web.archive.org/web/200606210351150/http://www.3dz.co.uk/packaging.html.
Search Report dated Jun. 5, 2008 for PCT Application No. PCT/US2007/026012 filed Dec. 19, 2007, 3 pages.
Search Report dated Mar. 12, 2008 for PCT Application No. PCT/US2007/21114 filed Oct. 2, 2007, 3 pages.
Search Report dated Mar. 13, 2008 for PCT Application No. PCT/US2007/21115 filed Oct. 2, 2007, 3 pages.
Written Opinion dated Mar. 22, 2011 for PCT Application No. PCT/US2008/057529 filed Sep. 18, 2009, 5 pages.
Application and File History for U.S. Appl. No. 12/562,795, filed Sep. 18, 2009. Inventors: Hoffman et al.
Application and File History for U.S. Appl. No. 13/184,872, filed Jul. 18, 2011. Inventors: Hoffman et al.
Office Action dated Apr. 9, 2014 for Canadian Application No. 2,735,897 filed Sep. 18, 2009, 2 pages.

* cited by examiner

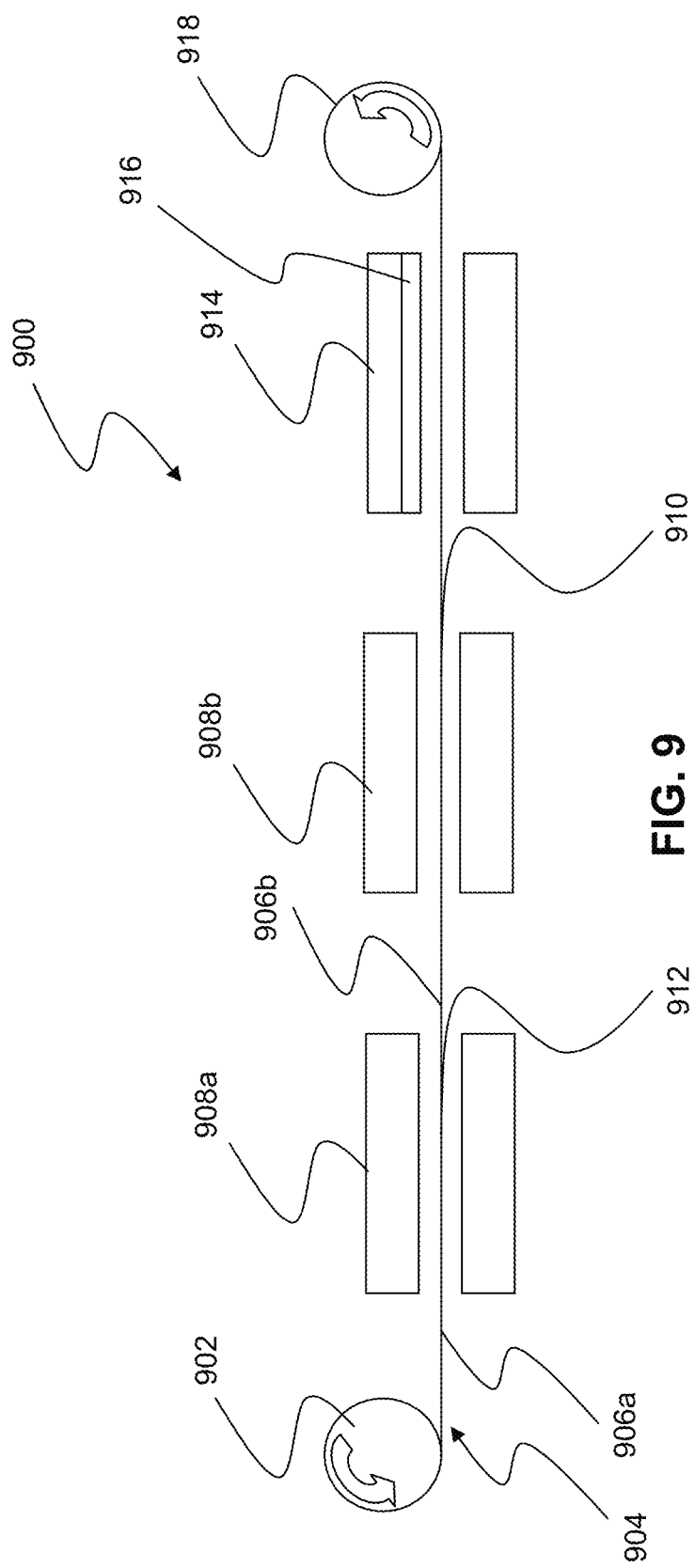

THIN FILM HIGH DEFINITION DIMENSIONAL IMAGE DISPLAY DEVICE AND METHODS OF MAKING SAME

RELATED APPLICATIONS

This application is a continuation-in-part of application Ser. No. 12/562,795 filed Sep. 18, 2009, which claims the benefit of U.S. Provisional Application Ser. No. 61/098,172 filed Sep. 18, 2008, and U.S. Provisional Application Ser. No. 61/223,882 filed Jul. 8, 2009, each of which is hereby fully incorporated herein by reference.

FIELD OF THE INVENTION

The invention relates generally to dimensional image display devices including a plastic film having an array of lenses and a dimensional image to be displayed through the array. More particularly, the invention relates to high definition dimensional image display devices manufactured from a thin film having a focal distance of ten mils or less (1 mil=0.001") and having a lens array that can be used to display or view an animated, 3D, or other dimensional image that is printed using a technique in which critical registration is not required.

BACKGROUND OF THE INVENTION

Dimensional image display devices are used to create visual effects such as, for example, 3D effects, animation, depth, and other such types of graphics. The dimensional image display devices can be applied to various articles as eye-catching promotional tools, advertising, branding, games, and the like because the dimensional images offer eye-catching images by providing multiple images and/or animation. Examples of articles can include, for example, containers, cups, packaging, wrappers, tubes, envelopes, greeting cards, invitations, napkins, posters, business cards, fabrics and clothing, billboards, stickers, labels, badges, pens, magnets, postcards, identification or gift cards, and any of a variety of articles.

Dimensional image display devices typically incorporate a printed image proximate a lens array. The printed image can be either directly bonded or printed to the lens array, or printed on a separate substrate and laminated to the lens array. Image segments or elements are printed using high resolution, and precise registration techniques to form the overall image. One such printing technique includes interlacing images, in which a composite of two or more images are interlaced with each other in individual slices or segments to form the overall image that will be viewed through a lens array. The interlaced image is then configured or mapped so that each lens of the array focuses on at least a portion of the interlaced image. The interlaced image is configured to accommodate both viewing distance and curvature through the lens.

Ink-to-ink registration is a term of art that describes the placement accuracy of different, or overlapping colors in relation to one another on an image, such as an interlaced image, from a four color process (4-CP) separation or other printing technique. When printing an image that has more than one color, depending on the method of printing, it is necessary to print the image or image element a separate time, and/or on multiple units, for each separate color. So that the final image is consistent, and so each of the colors lines up correctly, a system of registration is necessary. Ink-to-ink registration accuracy is particularly important in printing of interlaced images, as poor registration accuracy can result in a low quality dimensional image, such as image ghosting or color shift, loss of distinct motion, and the like, therefore creating excess waste and expense.

Lens-to-ink registration can be defined as the registration accuracy of the image or image elements to the lenses of the lens array. Lens-to-ink registration accuracy is critical in dimensional image display devices as poor lens-to-ink registration accuracy can also result in loss of distinct motion, unfocused or unrecognizable images, flipped or otherwise skewed images, and the like, again creating excess waste and expense.

One type of dimensional imaging technology well-known in the art includes lenticular image technology. Lenticular image technology includes a lenticular image, such as an interlaced image, in combination with a lenticular lens array. The lenticular lens array is formed from a web or sheet including a plurality of substantially parallel elongated cylindrical lenticules or lenses on one surface. The second surface is planar. Typically, the lenticular lens array is formed from a plastic material and can be formed from any of a variety of techniques including casting, coating, embossing, extruding, and the like. The interlaced image can be printed directly on the planar second surface, or can be printed on a separate substrate and subsequently laminated to the lenticular lens array by a clear adhesive, fusing, or other similar techniques. Examples of lenticular image technology can be found in U.S. Pat. No. 6,900,944 to Tomczyk; U.S. Pat. No. 6,424,467 to Goggins; and U.S. Pat. No. 7,359,120 to Raymond et al., the disclosures of which are incorporated herein by reference.

Currently available methods can provide a lens sheet or lenticulated sheet array, which can vary in thickness or caliper, for example, from about 10 mils to about 40 mils. The thickness of the extruded lenticular lens layer is suggested by the formula: $r=C \times f$ or $r=[(n'-n)/n'] \times f$ where r is the radius of curvature of a lenticular lens, C is a constant, f is the focal length of optimal focus thickness for the plastic, n' is the index of refraction of the lens construction material, such as an extruded plastic, and n is index of refraction of air. From the formula it is evident that the thicker the plastic the lower the pitch or lenticules per inch (LPI) and the lower the pitch, the coarser the lens. A coarse lens can give undesirable lens effects, for example, distortion of an underlying image. A coarser lens requires image graphics and text to be significantly large to avoid lens undesirable lens effects. When printing a lenticular image on a lenticular lens, the lens needs to be parallel to the interlace image, such as, for example within +/−½ lenticule per ten inches. If this is not maintained, the image does not have an acceptable vertical flip, but rather a skewed flip. Skew can be defined as unacceptable ink-to-lens registration accuracy of the vertical lenticular image elements to the vertical lenticular lenses.

Another type of dimensional imaging technology includes fly's eye or bug's eye image technology. Fly's eye or "integral" lens arrays are formed from a web or sheet including a plurality of domes or semi-circular structures, rather than the elongated lenses of lenticular technology. Similar to lenticular, an image, such as an interlaced image, can be printed on the planar side of the lens sheet or web, or printed on a separate substrate and laminated thereto. There are a number of benefits to using a fly's eye lens as opposed to a lenticular lens. The fly's eye lens is essentially a lenticular lens in multiple directions tangentially around the lens. This essentially allows one not only to interlace an image from left to right (horizontal direction), but also up and down (vertical direction), diagonally, or any combination thereof to give additional animated effects.

Current methods of producing dimensional images, such as lenticular images, include printing of lenticular sheets through a sheet fed press where, as discussed above, the caliper ranges from about 10 mils to about 40 mils. These sheets then go through additional offline processing steps. The result is an expensive lenticular display device with a limited number of applications because of its rigidity due to its overall thickness. At least two factors drive the cost of the lenticular display device: the amount of plastic used in creating the lens, and the number of process steps that are needed to print and convert a lenticular product.

To reduce the cost of manufacture by reducing the amount of plastic used, a lens sheet having a thinner caliper or gauge thickness is used, such as, for example, a lens sheet of about ten mils or less. When using a thinner lens, the pitch, or number of lenses per inch, is higher based on the formula described above. As the pitch increases, a width of each image element or slice of the interlaced image becomes thinner, which in turn makes ink-to-ink registration accuracy and resolution more critical. It has been found that ink-to-ink registration accuracy on a thinner caliper lens plastic sheet on a sheet fed press is extremely difficult, resulting in poor quality images.

Secondly, by switching the current sheet-fed process to a web press with inline laminating and finishing capabilities, it is possible to significantly reduce cost due to fewer process steps. Web presses are suited for running and printing thinner substrates and can have optional inline finishing capabilities, such as lamination and converting. However, web presses tend to have less ink-to-ink registration accuracy from color to color than sheet fed presses because the web tends to wander or "walk" from side to side through the press ink units if not tightly controlled. In particular, there tends to be more movement of the web as the caliper is decreased, especially if there is significant gauge thickness variation. Further, such problems can be exacerbated with thin films and substrates as a result of baggy edges of the web in the positions where web guidance devices read guidance information, thereby misguiding the web. Such devices are often expensive and temperamental or difficult to control within the tolerances needed for dimensional image display devices.

Attempts have been made to produce a high definition thin lenticular lens for viewing interlaced images. U.S. Pat. No. 6,424,467 to Goggins describes a high definition lenticular lens having an arc angle greater than about 90 degrees and a width of less than about 0.0067 inches (6.7 mils). The lens has a gauge thickness that is equal to or substantially equal to the focal length. However, the Goggins disclosure is limited to the lens array material, and does not address the printing or printing registration issues discussed supra. U.S. Pat. No. 7,359,120 to Raymond et al. discloses a method of manufacturing a device for displaying an interlaced image including creating an "ultrathin" lens array in the film by forming lens sets, and bonding an interlaced image including sets of elongate image elements to a second side of the film. Each of the lens sets is configured with lenses for focusing light from one of the image elements in a particular paired set of image elements by creating a unique configuration or cross-sectional shape for each lens of the lens set. The fabrication of the device can be done using a web process. The Raymond et al. disclosure, however, does not discuss the ink-to-ink registration issues, and rather focuses on eliminating the critical thin resolution of particular image elements that would otherwise be needed in traditional lenticular image technology.

Therefore, there remains a need for a dimensional image display and method of making such that would eliminate the need for critical ink-to-ink registration accuracy such that the finished piece or article would virtually always give a dimensional or motion effect when printed using a web press at any lens gauge thickness and pitch.

SUMMARY OF THE INVENTION

According to embodiments of the invention, a thin film display device for a displaying dimensional image can generally include a substrate comprising a lens array on at least a portion of the substrate, and an image layer defining a dimensional image, such as an animation or 3-D image, that is viewable through the lens array. The lens array comprises a plurality of lenses, such as lenticular lenses or fly's eye lenses. The lens coupled with the image layer defines a light steering optical layer having a focal distance measured from the peak of the lens or lenticule through the image layer. The light steering optical layer, or focal length, is about ten mils or less in thickness, such as, for example, five mils, and has a drape or flexibility of at least about eight degrees measured from a horizontal surface such that the display device can be used in a variety of applications, such as labels, packaging, security applications, and the like.

In one embodiment of the invention, the lens array comprises a preformed lens array material. A dimensional image, such as an interlaced image, hologravure image, or the like is printed on the preformed lens material on a surface opposite the lenses, a separate substrate, or both. The separate substrate is then laminated to the preformed lens material to form the display device.

In another embodiment of the invention, the substrate comprises a film, such as a plastic film. One of the surfaces of the film is embossed to form the lens array. A dimensional image is printed on the film on a surface opposite the lens array before and/or after the film is embossed. Alternatively, the image is formed on a substrate and the substrate is laminated to the film before or after embossing.

In yet another embodiment of the invention, a coating is applied to a substrate. The coating can be applied and then subsequently patterned to form the lens array, or the coating can be applied in a pattern, such as by printing, thereby forming a lens array. The substrate can be printed with the image on the same side that the coating is applied before the coating is applied, or can be printed on the opposite side of the substrate if the substrate is transparent before or after the coating is applied. The coating can then be subsequently cured.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 9 is a system for producing a dimensional image display device according to an embodiment of the invention.

Figure 1A:
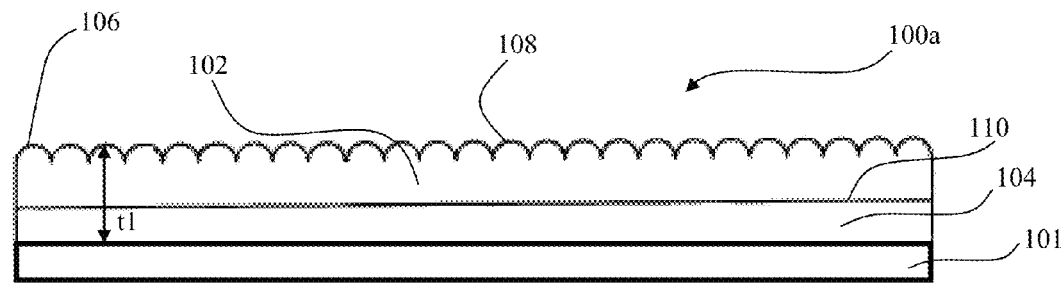
FIG. 1A is a cross-sectional view depicting a display device according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Embodiments address the above-described deficiencies and drawbacks inherent with fabricating thin lens dimensional image display devices, thereby increasing the available applications for dimensional image display devices while reducing the cost to fabricate the display device. Various embodiments are directed to thin lens dimensional image display devices including a lens array formed on a first surface of a substrate, such as plastic film, and a printed image on the second opposing surface of the substrate and/or a separate substrate bonded to the lens array. The lens array can comprise a plurality of lenses such as a lenticular, integral web (fly's eye), or any of a variety of suitable lens shapes. In one embodiment of the invention, the lens array comprises an integral web or fly's eye array such that the animation can be incorporated in the horizontal, vertical, or diagonal direction, or any combination thereof.

A gauge thickness of the thin film display device is the thickness of a "light steering optical layer" made up of the lens and the image. The gauge thickness can be about ten mils or less, such that the display device can be fabricated using web processes. The gauge thickness, i.e. the focal distance, is measured from the peak of the lens or lenticule through the image layer. The gauge thickness can be greater than ten mils; however such webs, particularly when the substrate is plastic, tend to suffer from "roll set" which is when the plastic takes on the curl of the roll causing problems during web processing, and resulting in a curled finished product.

The image is printed either directly onto the substrate that the lens array is formed on, or onto another substrate that is laminated to the lens array. The image is printed using an image technique that does not require precise color-to-color or ink-to-ink registration accuracy. In one embodiment of the invention, the image technique is one-color animation where the animation image is incorporated in a single color of the process colors, such as a 4-CP image. In other embodiments of the invention, the image technique is multi-color animation where the several colors are located in the same area of a substrate but animation is independent with respect to each color. In another embodiment of the invention, the image technique is hologravure, otherwise known as Inifinidepth®, which includes a holographic fringe pattern that gives a depth or 3D effect, again incorporated in a single color of the process colors, such as a 4-CP separation or image. In yet another embodiment of the invention, the image technique is bi-directional interlaced image. In yet another embodiment of the invention, a combination of one or more of these image techniques is incorporated.

The display device can be fabricated using a number of low cost, high speed processes. In one embodiment of the invention, a high speed printing process using a pre-fabricated lens array film web is used, wherein the lens array film web is formed by casting, extrusion, or the like. In another embodiment, a web press is used incorporating inline printing and embossing such that the plastic film or other substrate is printed on the second surface of the film before and/or after a lens array is embossed on the first surface of the film. In yet another embodiment, a web press is used incorporating inline printing with inline application of a coating that is embossed or patterned upon application to a substrate, such as a plastic film or paper. The coating can be pre-, simultaneous, and/or post cured as it is patterned. The web substrate can be printed before and/or after the lens array is formed. In another embodiment, a pre-printed web is spot-embossed with a lens pattern in a converting line. Each of the web processes can further include inline and/or offline finishing capabilities such as, for example, curing, additional printing, converting, packaging, laminating, cutting, punching, and the like.

The thin lens image display device can be used in a wide variety of applications and articles. It can be subsequently converted or manufactured into packaging films, labels, stickers, or wrappers that later can be applied to or around a formed product or formed products. Alternatively, the film web can be used alone, or laminated to one or more other substrates to form the article itself, such as a wrapper, bottle, poster, flexible packaging, or the like. In one embodiment, the lens array can be spot applied to one or more portions of packaging, such as a portion of a box. In another embodiment, the thin lens image display device can be used in security applications such as, for example, security labels, tax stamps, identification cards and documents, checks, currency, authentication labels, and the like. For example, an authentication label incorporating a thin lens image display device for high end often copied products can be useful for ease of identification by a customs agent to identify a copied product.

The combination of a thin film lens array fabricated using web processes with multiple inline capabilities reduces the cost of manufacturing dimensional image display devices, while increasing the flexibility thereby expanding the number of applications. Additionally, the use of thin films and web processes allows use of lower cost materials, including virgin and recycled materials and blends thereof, such as polypropylene (PP), amorphous polyethylene terephthalate (APET), and polyethylene (PE) currently used in packaging applications, further reducing costs.

In one embodiment of the invention, referring to FIG. 1A, a high definition thin film dimension display device 100a generally comprises a substrate 101, a lens array 102, and a dimensional image 104. In one embodiment, lens array 102 can comprise a preformed lens material including a first non-planar surface 106 formed of a plurality of lenses 108 on at least a portion of first surface 106, and a substantially planar second surface 110. Image 104 can be either printed directly on at least a portion of second surface 110, or can be printed on a separate substrate 101 and laminated to lens array 102 to form a composite structure. Such substrates can comprise paper, plastic, metallized substrates such as foil, paperboard, cardboard, glass, and combinations thereof. Lamination can be accomplished via a clear adhesive sandwiched between second surface 110 and substrate 101, or any of a number of laminating techniques.

Lens array 102 can comprise plastic material such as, for example, polyester, polycarbonate (PC), polyvinyl chloride (PVC), polyethylene terephthalate (PET), amorphous polyethylene terephthalate (APET), glycol-modified polyethylene terephthalate (PETG), polypropylene (PP), polyethylene (PE), polystyrene (PS), and other suitable plastics and combinations thereof. The plastic material can be transparent or translucent such that image 104 can be seen through lens array 102. Thin film display device 100a can have a gauge thickness (or focal distance) "t1" from about one to about ten mils, or about five mils or less, which includes lens array 102, and image 104 (light steering optical layer).

Figure 1B:
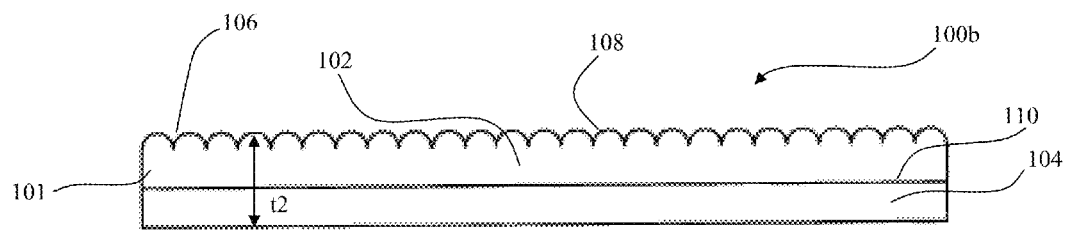
FIG. 1B is a cross-sectional view depicting a display device according to another embodiment of the invention.

In another embodiment, shown in FIG. 1B, high definition thin film dimension display device 100b generally comprises a substrate 101 comprising a plastic material that can be embossed or otherwise patterned by the application of heat and/or pressure, laser engraving, or any of a number of known embossing techniques to form lens array 102, and a dimensional image 104. Dimensional image 104 can be printed on the substrate 101 opposite the embossing, or on a separate substrate (not shown) and laminated or bonded thereto. Thin film display device 100b can have a gauge thickness (or focal distance) "t2" from about one to about ten mils, or about five mils or less, which includes lens array 102, and image 104 (light steering optical layer).

Figure 1C:
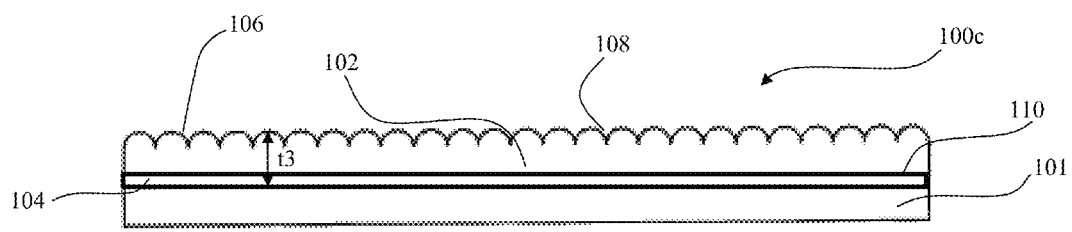
FIG. 1C is a cross-sectional view depicting a display device according to yet another embodiment of the invention.

In yet another embodiment, shown in FIG. 1C, high definition thin film dimension display device 100c generally comprises substrate 101 such as, for example, plastic, paper, and the like, having a clear coating, such as a water-based coating, solvent-based coating, radiation or UV curable coating or varnish or the like, applied to at least a portion of the plastic substrate. The clear coating is capable of being patterned by any of a number of techniques known in the art to form lens array 102, which will be described in more detail below. The coating can be patterned after application to substrate 101, such as by embossing or the like, or can be printed on substrate 101 to form lens array 102, such as by digital printing including inkjet printing. Thin film display device 100c can have a gauge thickness (or focal distance) "t1" from about one to about ten mils, or about five mils or less, which includes lens array 102, and image 104 (light steering optical layer).

Figure 2:
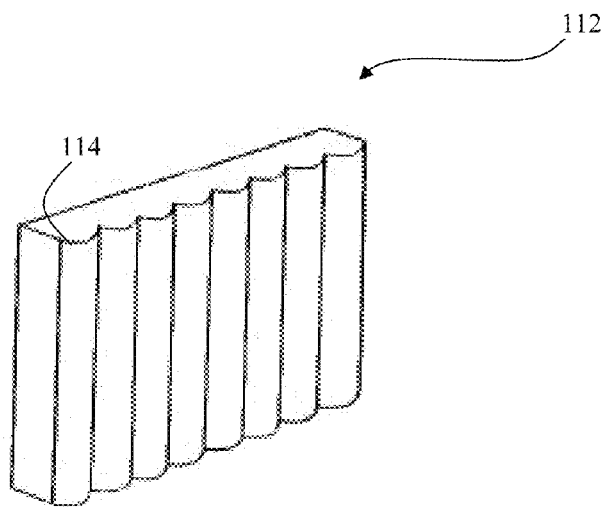
FIG. 2 is a perspective view depicting a lenticular lens array according to an embodiment of the invention.
Figure 3:
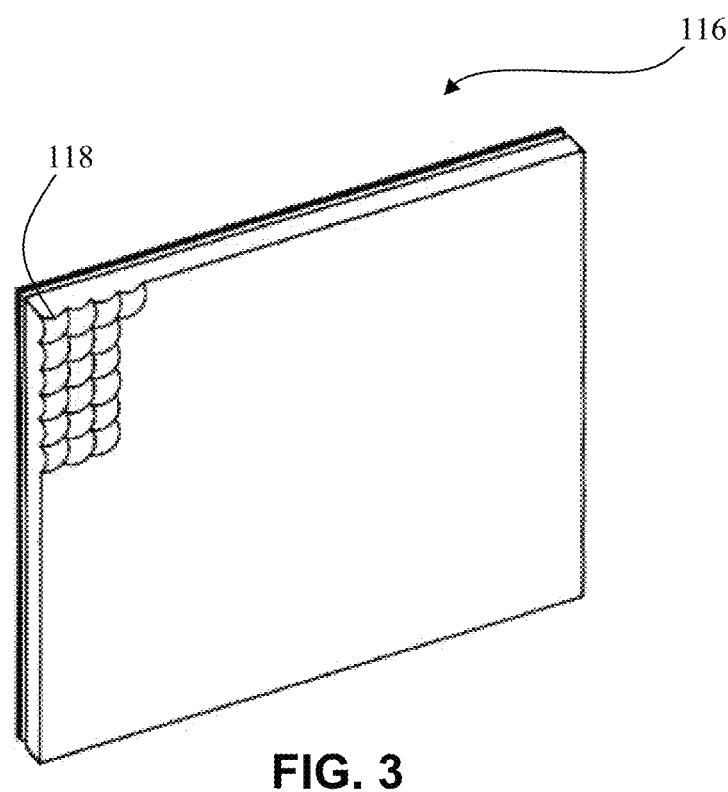
FIG. 3 is a perspective view depicting a fly's eye lens array according to an embodiment of the invention.

According to an embodiment depicted in FIG. 2, lens array 102 comprises a lenticular lens array 112. Lenticular lens array 112 generally includes a plurality of elongated cylindrical lenses 114 over at least a portion of the first surface of substrate 101. In another embodiment depicted in FIG. 3, lens array 102 comprises a fly's eye lens array 116. Fly's eye lens array 116 generally includes a plurality of dome-shaped, or circular lenses 118 over at least a portion of the first surface of substrate 101. In other embodiments of the invention, other suitable shaped lenses, such as, for example, square, pyramidal, diamond, and the like and combinations thereof, can be used to form lens array 102. In one embodiment, fly's eye lens array 116 comprises rows and columns to form a matrix of lenses having square bases. In one embodiment, fly's eye lens array 116 is patterned using a thin film formula of $r=(n-1)/n \times f$ where r is the radius of curvature of a lenticular lens, C is a constant, f is the focal length of optimal focus thickness for the plastic, and n is index of refraction of air.

Figure 3A:
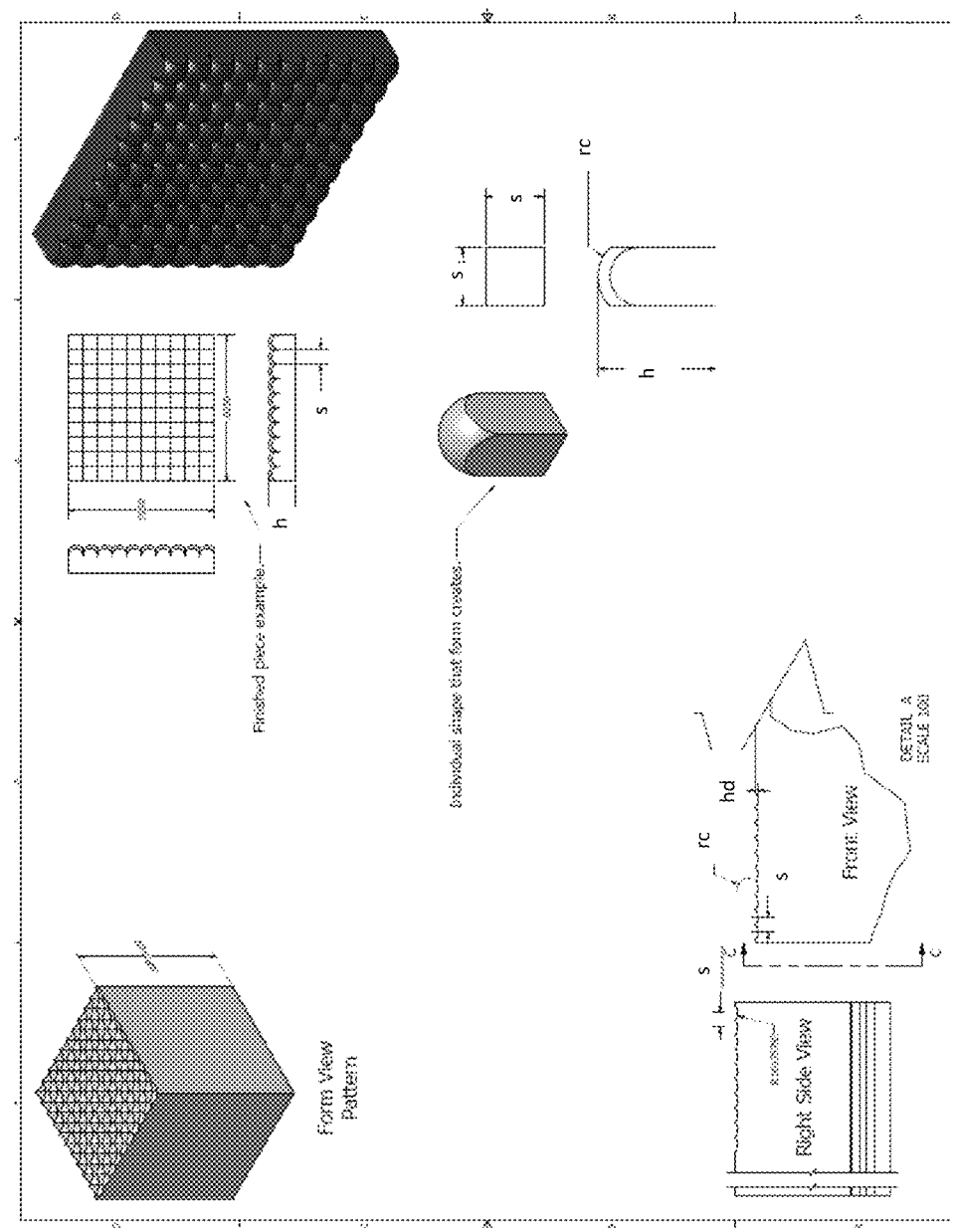
FIG. 3a is a engineering schematic depicting a fly's eye lens array pattern according to another embodiment of the invention.

In one embodiment, such as is depicted in FIG. 3a, fly's eye lens array 116 includes a plurality of lenses that can focus at about 1 to about 10 mils, or about 5 mils. This is the focal distance, which is measured from the peak of the lens through the image or image layer. Based on formula $r=(n-1)/n \times f$ where r is the radius of curvature of the lens, n is the index of refraction of the plastic (for example, for APET n=1.57), and f is the thickness, or focal distance, of the lens. For example, for a fly's eye APET lens having a radius of curvature of about 1.76 mils, the focal distance and therefore thickness of the lens is approximately 5 mils. Lens array 116 as illustrated is a 10×10 matrix; however, any configuration can be contemplated. The lenses of the array can be all substantially the same shape as illustrated, or can be individually shaped. Each lens has a square base with each side "s" ranging from about 1 to about 5 mils, such as about 2.5 mils. The total height "h", i.e., from the base to the top of the dome, of each lens is from about 1 mil to about 10 mils, such as about 5 mils. The height "hd" of each dome is from about 0.1 mil to 2 mil, and more particularly about 0.5 mil. The radius of curvature "rc" of each of the lenses is from about 0.5 mil to about 2 mils, such as about 1.5 mils.

Figure 8:
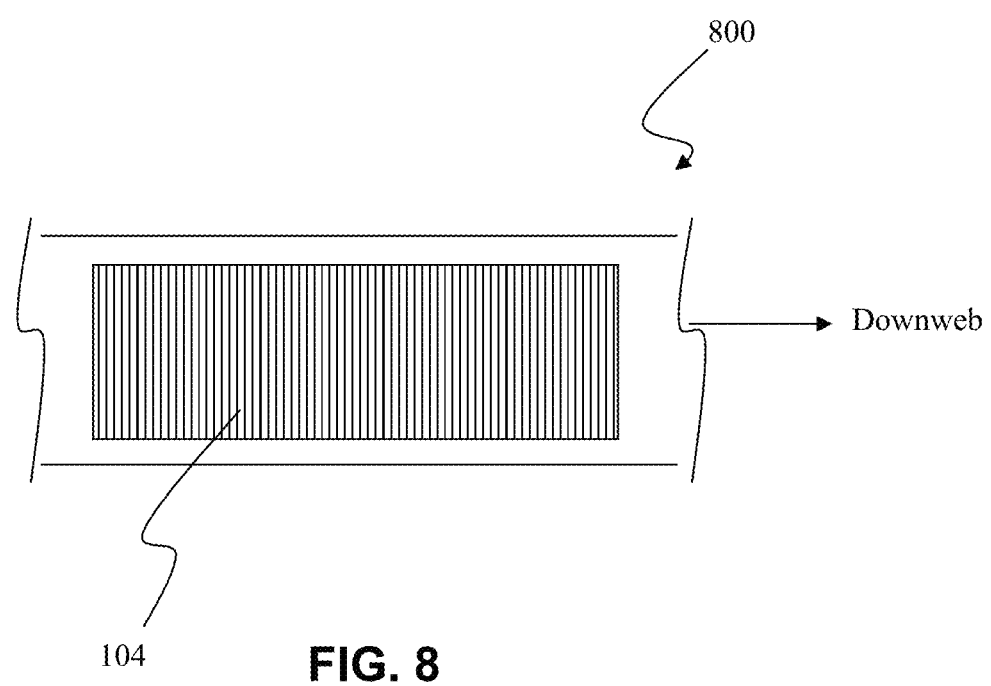
FIG. 8 is a top view depicting an imaged web for use with a fly's eye lens array.

As discussed previously, fly's eye lens arrays have some advantages over lenticular lens arrays in that the fly's eye lens arrays create more opportunities for animation direction, such as vertical, horizontal, and/or diagonal. Lenticular lenses are limited to animation in only a single direction. In one embodiment as depicted in FIG. 8, a web 800 is printed with image 104 for use as labels, such as beverage bottle labels. For this type of application, often times the long edges of the labels are in the machine or web direction. If a lenticular lens array is used, the lenticular lens array can only be extruded in the machine or web direction, thus requiring image 104 to be printed cross-web. However, if a fly's eye lens is used, it allows image 104 to be printed in either the machine or cross-web direction to give ultimate flexibility in fabrication of labels.

Image 104 can be printed using any of a number of suitable printing techniques such as, for example, flexographic, lithographic, gravure, rotogravure, digital inkjet, digital toner, screen printing, and the like and combinations thereof. Image 104 can be printed using traditional and non-traditional inkjet ink, dry offset ink, litho ink, flexo ink, silk screen ink, latex ink and the like in one of the aforementioned printing techniques or combination of techniques. The inkjet ink used may be a traditional solvent- or UV-based ink. In one embodiment, UV curable inks can be used, such as SUNCURE inks commercially available from Sun Chemical of Carlstadt, N.J., and UV curable inks commercially available from Flint Inks of St. Paul, Minn. Other suitable printing materials or media can include toners, water- or solvent-based inks, solventless inks, other forms of radiation curable inks, and combinations thereof.

The printing or imaging technique can reduce or eliminate the need for precise ink-to-ink registration accuracy. Rather than the standard interlaced image of the prior art, image 104 can be incorporated by a one-color animation technique, hologravure technique, bi-directional interlacing, or combinations thereof. In one embodiment, one-color animation is used. A one-color animation technique includes designing a dimensional image to get a desired dimensional effect by building the animation images from only one color which overprints other colors of a color process, such as a 4-CP separation. The advantage of one-color animation is that it is not necessary to have the colors in precise ink-to-ink registration. The animation will always be viewable and give high-quality dimension effect regardless of the register of the other colors. Because of the elimination or reduction of the need for critical ink-to-ink registration accuracy, web press printing with registration tolerances less than sheet fed press tolerances becomes a viable manufacturing option without compromising image quality.

Hologravure images, known by the trade name Infinidepth®, are similar to one-color animations in that the animating effect is typically incorporated in one-color of a color process, such as a 4-CP separation. However, hologravure techniques incorporate a holographic fringe pattern that gives a depth or 3D effect to the image, either in combination to the animation produced from one-color animation, or alone. The hologravure technique is set forth in a series of currently pending patent applications including U.S. Application Publication Nos. 2008/0088126 entitled "Layered Image Display Applications and Methods," 2008/0088931 entitled "Layered Image Display Sheet," and 2008/0213528 entitled "Customized Printing with Depth Effect" all of which are incorporated herein by reference in their entireties.

Bi-directional interlacing is an imaging process in which an interlaced image is interlaced in a first direction, e.g. side-to-side or left-to-right, and an interlaced image is interlaced in a second direction, e.g. top-to-bottom. The bi-directional interlaced image can then be printed. One-color animation can be incorporated into the bi-directional interlaced image to accommodate limitations in the printing process. Bi-directional interlacing can be used, for example, to create a 3D or animation illusion in a first direction, while creating other animation, color change, or a 3D effect in a second direction, depending on the viewing angle.

Figure 4:
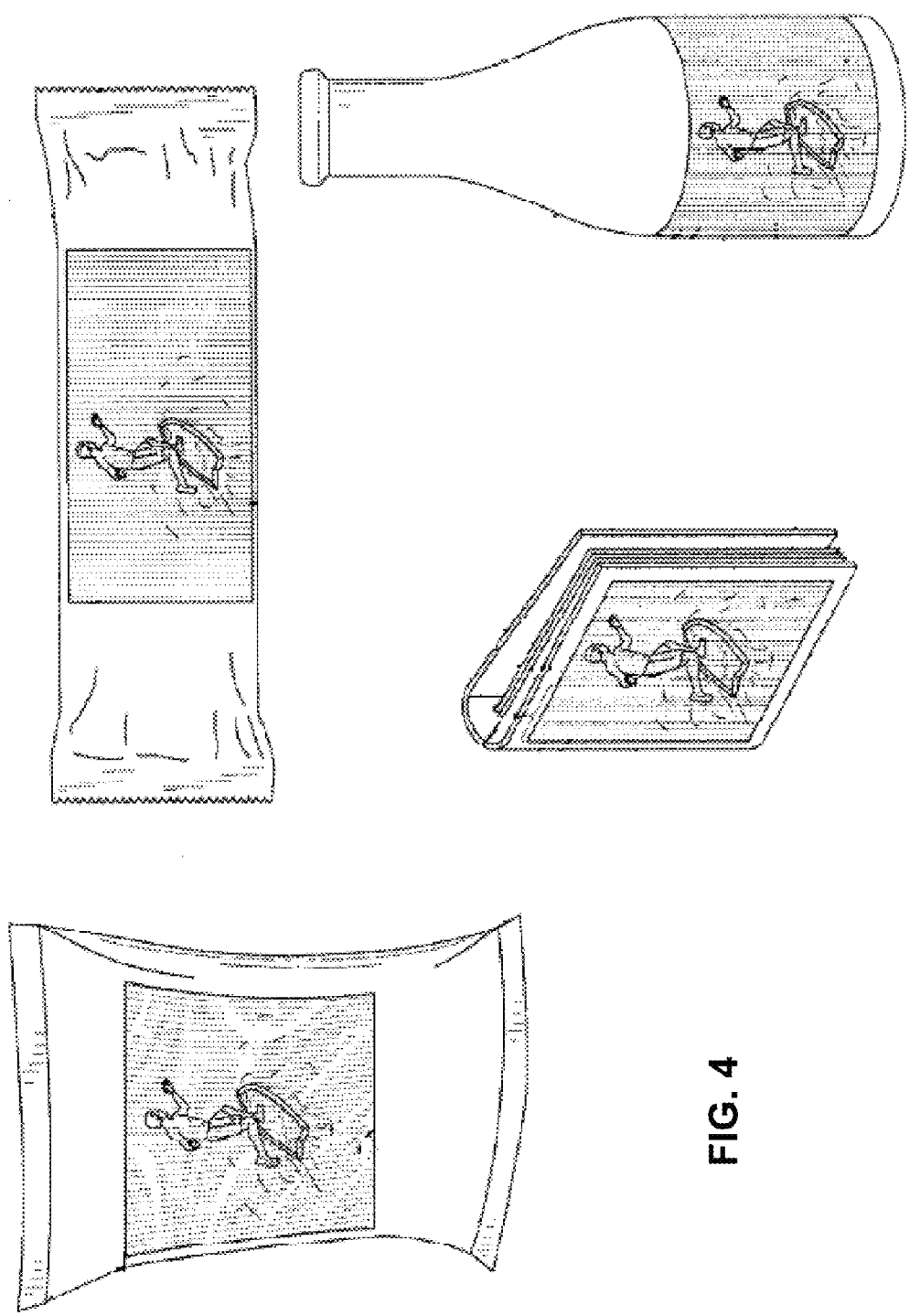
FIG. 4 is a perspective view depicting a variety of articles incorporating a dimensional image display device according to embodiments of the invention.

By incorporating a printing technique that reduces or eliminates the need for ink-to-ink registration accuracy, display devices 100 can be printed using web presses at high speeds that have finishing capabilities in-line. Further, the above-referenced printing techniques allow thin films, i.e. about ten mils or less, to be used to form a more flexible display device that can be used in a wider variety of applications such as packaging applications, security applications, and on or around articles, such as on bottles, wrappers, bags, books, and any number articles, some of which are depicted in FIG. 4. Additionally, the above-referenced printing technologies allows for the use of lower cost materials which were not previously extrudable or cast economically.

In particular examples, the display devices manufactured according to embodiments of the invention can be used in in-mold, blow molding, or thermoforming applications as decorative labeling and/or for barrier applications. Examples of such labels are described in, for example, U.S. Patent Application Publication No. 2011/0223362 entitled "Metalized In Mold Label and Molded Articles Having Same," and U.S. Pat. No. 7,153,555 entitled "Plastic Objects Including Lenticular Lens Sheets," both of which are herein incorporated by reference in their entireties. Labels according to embodiments of the invention can be produced, for example, as bundled printed sheets as described in, for example, U.S. Patent Application Publication No. 2006/0191426 entitled "Bundled Printed Sheets," incorporated herein by reference in its entirety.

There are a number of different methods of fabricating dimensional image display device 100, including direct printing of a pre-formed lens substrate, printing of a substrate and lamination to a pre-formed lens substrate, direct embossing or patterning of a printed or non-printed substrate inline, applying a clear coating to a substrate and patterning the coating inline after application, applying the coating in a pattern by printing the coating, and combinations thereof.

Figure 5:
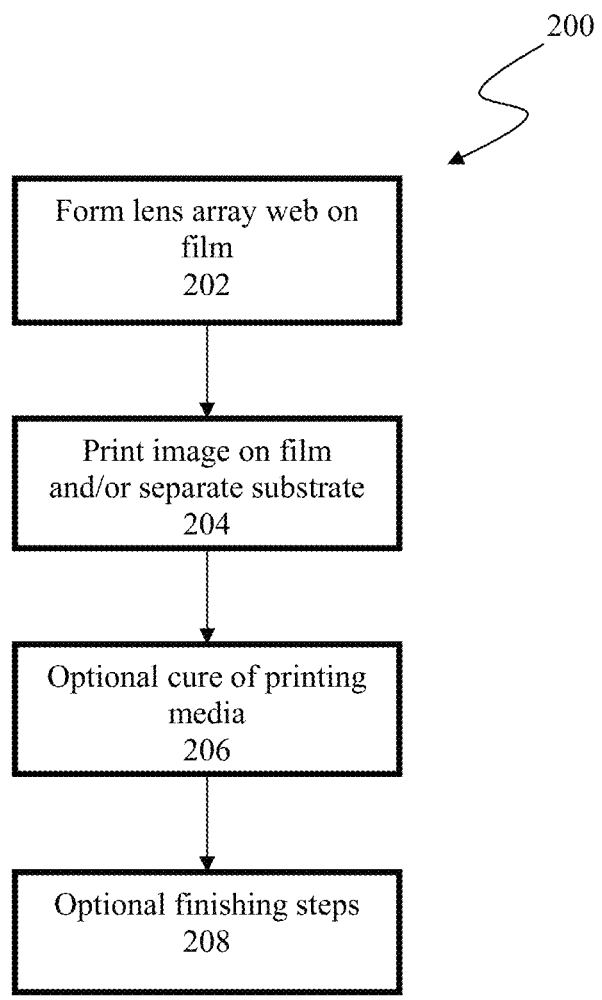
FIG. 5 is a block diagram depicting a pre-formed lens array process according to an embodiment of the invention.

Referring to FIG. 5, in one embodiment, thin film display device 100a can be manufactured using a web press process 200 including lens array 102 comprising a preformed lens array material in roll form. Examples of suitable lens array materials include a 10 mil APET 133 LPI lens available from Spartech, and a 5 mil polypropylene lens from MicroLens. The preformed lens arrays can be formed at 202 by casting or extruding a plastic material into a web, and subsequently patterning the desired lens features into at least a portion of one of the surfaces of the plastic web. The patterning can be accomplished via embossing, laser engraving, or any of a variety of patterning techniques and combinations thereof. The finished film is then wound into roll-form to be used in the web printing press. The lens array film roll is unwound and enters one or more printing stations. At 204, a dimensional image 104 is printed on at least a portion of the un-patterned surface of the lens array film and/or on a separate substrate to form display device 100a. Dimensional image 104 can be created in one or more colors using one-color animations and/or hologravure. Dimensional image 104 can be a stationary 3D image, an animated image including background and/or foreground movement, or both. Depending on the printing medium used, display device can pass to an inline optional cure station at 206 to partially or completely cure the printing medium. Suitable cure stations can include, for example, UV curing, LED lights, heat or IR curing, E-beam curing, dryers, microwave, and any suitable curing station or combinations thereof. In one particular embodiment of the invention, at least part of dimensional image 104 is printed on a separate substrate 101 from the preformed lens array material 102. The un-patterned surface of the preformed lens array material is bonded or laminated to substrate 101 using a clear adhesive, fusing techniques, or any of a variety of suitable bonding techniques such that dimensional image 104 is viewable through lens array 102, thereby forming display device 100a.

At 208, printed preformed lens array material can go to any of a variety of inline and/or offline finishing steps, including, but not limited to, lamination to a substrate, converting, additional printing, additional curing, forming, labeling, packaging, and combinations thereof. The finished product can be in the form of labels to be applied to any of a variety of articles, or can be converted or formed itself into a finished article.

Figure 6:
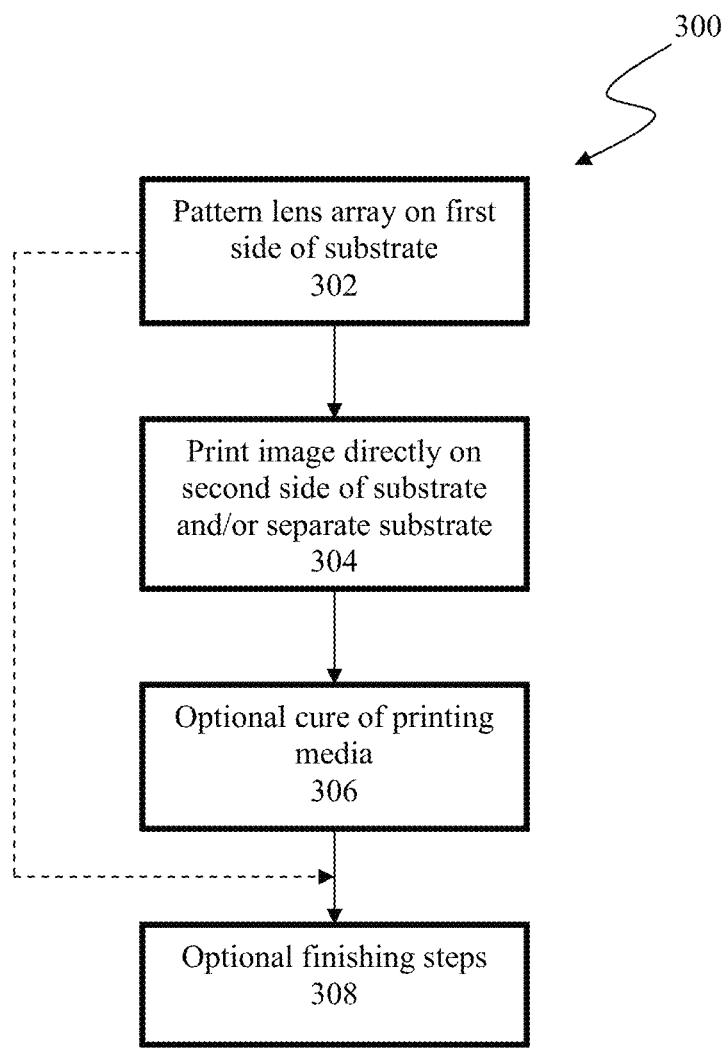
FIG. 6 is a block diagram depicting an inline patterned lens array process according to an embodiment of the invention.

Referring to FIG. 6, in another embodiment of the invention, thin film display device 100b can be manufactured using a web process 300. Process 300 includes an inline lens array process in which lens array 102 is formed by patterning of substrate 101, such as a plastic film. At 302, at least a portion of a first surface of the substrate film is patterned with lens array 102, which can be carried out by any of a variety of patterning techniques for thin films know in the art, such as embossing, laser engraving, or the like. As disclosed in U.S. Pat. No. 7,359,120 to Raymond et al., in one embodiment, a fabrication technique is inline embossing at high speeds using a roll embossing tool. In this embodiment, a film is cast or extruded, and a pattern providing the lens array is placed into the film with a heat or chilled roller. There are several methods of performing the embossing at these high speeds. Embossing can occur at the time a film is cast, calendared, or extruded. Normally, the embossing is done inline with a chilled embossing roller while the film is still hot. The pressure is applied between a bottom and top roller. For example, the bottom roller may be a polished roller and the top roller an engraved roller, e.g., made out of a nickel-coated copper that is accurately machined in an air bearing lathe. The hot film can comprise, for example, polypropylene, PET, cast PVC, calendar PVC, cast polypropylene, PETG, or any combination of film or co-extrusion. The chosen material should be stable and maintain the desired structure through the printing and embossing process. It is also important to note that the refractive index of the material chosen dictates optimal lens thickness to provide accurate focusing of image 104. Depending upon width, temperatures, pressures, and other factors, the film may be embossed at up to 10,000 feet per minute. One reason for using a film roller in the film embossing process is that the molecules in the film form and freeze into place forming lens array 102 more accurately when a hot film is embossed with a chill roller regardless of the process.

In another embodiment, cold film can be used. Cold film can be heated and embossed with a hot roller forming lens array 102. This can be done at slightly below the melting temperature or at the melting temperature of the film. The speed at which this embossing can be done is based upon the heat and pressure of the equipment available. For example but not as a limitation, if a substrate melts at about 300 degrees Fahrenheit, embossing can be done at about that temperature and, in some cases, at about 6,000 feet per hour.

In yet another embodiment, cold embossing can be used to form lens array 102. Cold embossing can be done using extreme pressures between nip rollers while narrow web widths are easier and require less tonnage. It is possible in some embodiments, however, to emboss in wide web at up to and over about 60-inch web widths. Such cold embossing of lens array 102 into plastic or other material substrates can be done at fairly high rates of speed such as up to about 10,000 feet per hour or more. This is done much the way holographic embossing patterns are embossed in film. The structures tend to be accurate, but the life of the tool is sometimes not very long due to the higher pressures utilized.

In yet another embodiment, and not necessarily for web-based processes, film patterning to form lens array 102 can also include platen embossing. Flat dies are engraved in copper magnesium, nickel, and other metals. These dies are placed in equipment such as Bobst die cutters and Heidelberg's, Kluges, and other equipment manufacturers' die cutters, punches, presses, or the like used in platen embossing. The film may be fed through in rolls or in sheets and embossed with heat and pressure or just pressure to form lens array 102 on a side of the film or substrate. Lenses 108 are embossed onto any of the films using pressure and/or heat and appropriate dwell time to form lenses 108. A significant tonnage or high pressure is generally used to emboss the film in the case of platen embossing.

In any of the above embodiments, and particularly platen embossing, one can have "spot" lens structures that can be registered to the printing in a way such that the lens does not always appear over the printing.

For embossing of lens array 102 to be effective, the flat dies or rollers/cylinders have to be accurately formed to include a reverse image of one or more of lenses 108 (e.g., a number of parallel lens set extending side-by-side to provide a lens surface of a lens array). In addition to using diamond or other cutting tools to form the dies or embossing rollers, one of the methods of manufacture is the use of photo-etching for the engraving of the flat embossing dies or embossing cylinders or rollers. A standard method of photoengraving or photo-etching is done by using an emulsion over a metal or polymer surface and then exposing the areas in which the photo emulsion may be exposed to UV light. The areas that are exposed generally remain intact (but it can be the opposite effect), and the remaining area is exposed and unprotected. An acid bath is generally used to wash away the unprotected areas (i.e., the areas that lacked the protective emulsion). The metal or polymer with a pattern defined by the emulsion is left behind leaving raised surfaces with a desired pattern and contour (e.g., a reverse image of a particular lens array 102 or for a number of lens arrays as it is expected that numerous lens arrays may be embossed into a film or sheet at one time in manufacturing processes, paired with a plurality of images). The process can be used to make etched dies for embossing papers and foils where some three-dimensional relief is needed. This process can be done with a stationary light source.

At 304, the patterned film substrate 101 is printed with a dimensional image 104 in one or more print stations using one-color animation, hologravure technique, or combinations thereof, as described above. Dimensional image 104 can be printed onto substrate 101 before embossing at 302, after embossing at 302, or both forming display device 100. Dimensional image 104 can then be optionally cured, as discussed above in step 306 in one or more curing stations. At 308, display device 100 can go to any of a variety of inline and/or offline finishing steps, including, but not limited to, lamination to a substrate, converting, additional printing, additional curing, forming, labeling, packaging, and combinations thereof.

In another embodiment, a separate substrate is printed with image 104 either inline or offline, and is bonded or laminated to the film substrate 101 either before or after lens array 102 is embossed on substrate 101. Film substrate 101 can be printed in addition to the separate substrate. For example, the one-color of one-color animation can be printed directly onto the back of film substrate 101, whereas the remaining colors are printed on the separate substrate. Such separate substrates can comprise paper, plastic, metallized substrates such as foil, paperboard, cardboard, glass, and combinations thereof. Bonding or lamination can be accomplished via a clear adhesive sandwiched between second surface 110 and the separate substrate, or any of a number of bonding techniques, such that dimensional image 104 is viewable through lens array 102.

The finished product having a display device 100a can be in the form of labels to be applied to any of a variety of articles, or can be converted or formed itself into a finished article.

Process 300 allows for formation of lens array 102 at 302 to be inline with printing at 304, as well as additional optional finishing at 306, and does not require separate equipment and/or process steps, thereby reducing the cost to make display device 100. The individual steps of process 300 can be formed in any of a variety of configurations and are not limited to the sequence shown in the block diagram of FIG. 6. It is also contemplated that one or more steps of process 300 can be performed individually at different times, depending on equipment availability, configuration, and other such factors. Further, thinner films can be used in process 300, such as films that have a gauge thickness of about ten mils or less, thereby reducing the amount of plastic needed to produce display device 100. However, it is contemplated that process 300 can also be used to create display devices with thicker gauges, i.e. greater than about ten mils.

Figure 7:
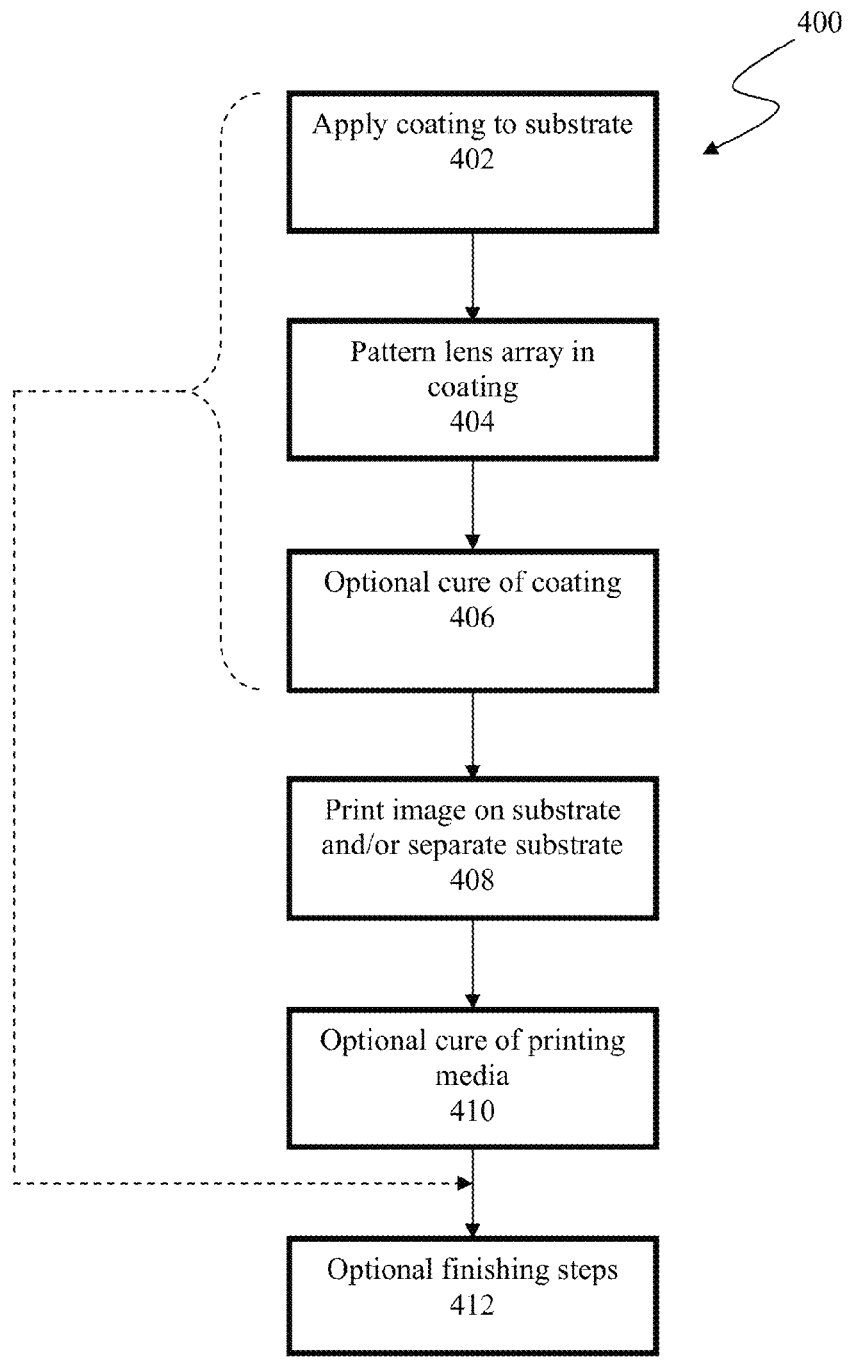
FIG. 7 is a block diagram depicting an inline patterned coating process according to an embodiment of the invention.

In yet another embodiment and referring to FIG. 7, thin film display device 100c can be manufactured by process 400. Process 400 includes applying a coating at 402 to at least a portion of a first surface of substrate 101, such as, for example, paper, plastic, paperboard, cardboard, glass, metallized substrates such as foil, and combinations thereof. The coating can be applied either inline or offline. This coating is patterned at 404 to form lens array 102. The coating is either applied and then patterned, or can be patterned during application, such as printing lens array 102 on substrate 101. The total thickness of the patterned film assembly includes both substrate 101 and the patterned coating. The coating is optionally cured at 406 before patterning at 404, after patterning at 404, or both to form lens array 102.

Image 104 is printed at 408 on substrate 101 before and/or after the coating is applied. Printing at 408 is accomplished similar to printing at 204 and 304 described above. Depending on the type of substrate used, image 104 can be printed on one or both surfaces of the substrate. For example, if the substrate is opaque, such as paper, image 104 can be printed on first surface 104 and the coating is subsequently applied over image 104. The second surface of the substrate can also be printed. Alternatively, if the substrate is transparent, the first surface can be printed with image 104 before the coating is applied, and/or the second surface can be printed with image 104 before and/or after the coating is applied to the first surface.

Image 104 can then be optionally cured, as discussed above at 410 in one or more curing stations. At 412, printed lens array 102 can go to any of a variety of inline and/or offline finishing steps, including, but not limited to, lamination to a substrate, converting, additional printing, additional curing, forming, labeling, packaging, and combinations thereof. The finished display device 100 can be in the form of labels to be applied to any of a variety of articles, or can be converted or formed itself into a finished article.

The coating that is applied to at least a portion of the substrate 101 can be, for example, a radiation curable coating such as e-beam, UV, or the like, a water-based or solvent-based coating, varnishes, urethanes, acrylourethanes, any of a variety of suitable coatings. The coating can be applied to at least a portion of substrate 101 by any of a number of suitable coating techniques including, but not limited to, extruding, casting, printing such as inkjet printing, flexographic printing, rotogravure, curtain coating, spraying, gravure, mire rod coating, and the like. A total gauge thickness, i.e. substrate and patterned coating, can be anywhere from less than about 1 mil to about 40 mils, particularly less than 10 mils, and more particularly about less than 5 mils.

In one embodiment of such coating processes, substrate 101 can comprise paper, plastic, metallized substrates such as foil, paperboard, cardboard, glass, and combinations thereof. The substrate can be coated with a coating, such as a UV coating, at less than about 1 mil, such as about ½ mil, to about 5 mils, and the coating can be cured through an engraved roller which may be glass or clear plastic. The roller is clear such that the UV or E-beam is directed to pass through the roller while it is in contact with the substrate and squeezing the coating into place on the substrate, whereby lenses 108 are formed exactly or within very tight tolerances while they are cured to form a lens array 102.

In another embodiment, a coating, such as a UV coating, is applied to at least a portion of a first surface of the substrate using the above described techniques for coating application. The coated web is then sandwiched or nipped between a patterned or engraved belt laminator having a relief of the lens array pattern, and a chill roll. One or more cure stations, such as a UV lamp, are placed within the belt laminator assembly such that the patterned web is cured as it passes over the chill roll, forming lens array 102 on at least a portion of the substrate. The substrate is printed with image 104 either before the coating is applied, or after lens array 102 is formed, or both.

In yet another embodiment, a coating, such as a UV coating, is applied to at least a portion of the first surface of the substrate. The coated web then passes through a metal press, such as a platen press having a first machined plate with a relief of the lens array pattern proximate the coated side of the web, and a planar plate positioned proximate the uncoated side of the web. Pressure and optional heat are applied to localized areas of the web to form the pattern in the coating. One or more subsequent cure stations, such as a UV lamp, are positioned downweb to cure the patterned coating to form lens array 102. Again, the substrate is printed with image 104 either before the coating is applied, or after lens array 102 is formed, or both.

In another embodiment, a coating, such as a UV coating, is applied to at least a portion of the first surface of the substrate. A machined blade with grooves, for example, is selectively positioned proximate the coated side of the web to form a pattern in the coating, such as lenticules in the machine direction. One or more subsequent cure stations, such as a UV lamp, are positioned downweb to cure the patterned coating to form lens array 102. Again, the substrate is printed with image 104 either before the coating is applied, or after lens array 102 is formed, or both.

In another embodiment, a coating, such as a UV coating, is applied to at least a portion of the first surface of the substrate. Similar to the belt laminator embodiment, the coated web is then sandwiched or nipped between a patterned or laser-engraved silicone roller or flexographic photopolymer plate having a relief of the lens array pattern, and a chill roll. One or more subsequent cure stations, such as a UV lamp, are positioned downweb to cure the patterned coating to form lens array 102. Again, the substrate is printed with image 104 either before the coating is applied, or after lens array 102 is formed, or both.

In yet another embodiment, a coating, such as a UV coating, is applied to at least a portion of the first surface of the substrate. A UV lamp is positioned proximate the coated surface of the substrate to at least partially cure the coating. A heated machined metal roll is placed downweb from the UV lamp. The metal roll is engraved with the relief of the lens array pattern. The substrate is sandwiched between the machined roll and a nip roll to emboss lens array 102 in the coating. One or more subsequent cure stations can then be placed after the machined roll to further cure the coating if is not already completely cured. Again, the substrate is printed with image 104 either before the coating is applied, or after lens array 102 is formed, or both.

In yet another embodiment, a coating, such as a UV coating, is applied to at least a portion of the first surface of the substrate using a digital printing press, such as inkjet heads, to apply a patterned coating in accordance with a desired lens array, thereby eliminating the embossing step. One or more subsequent cure stations, such as a UV lamp, are positioned downweb to cure the patterned coating to form lens array 102. Again, the substrate is printed with image 104 either before the coating is applied, or after lens array 102 is formed, or both.

In any of the above coating processes, a substrate 101 can be coated with any of the clear coatings mentioned above (keeping in mind that any coating and its refractive index is combined with the thickness and appropriate film refractive index for the appropriate and pre-engineered thickness of the lens array). In alternative embodiments, after the coating is applied to substrate, it can be cured and then patterned. In other embodiments, the coating is only partially cured and then patterned while it is in a semi-liquid state. In some other embodiments, the coating on the substrate is patterned in a total liquid state or more liquid state and then cured after the patterning such as down the web a few feet up to several hundred feet. In the former case where the liquid is partially cured, the coating may have a final curing later down the production line either immediately or down the web several feet, and in some cases, the coating may be pre-engineered to post cure in a solid state several hours or even days later to an acceptable hardness.

The finished product with display device 100 can be in the form of labels to be applied to any of a variety of article, or can be converted or formed itself into a finished article.

Process 400 allows for formation of lens array 102 in steps 402 to 406 to be inline with printing at 408, as well as additional optional finishing at 412, and does not require separate equipment and/or process steps thereby reducing the cost to make display device 100. The individual steps of process 400 can be formed in any of a variety of configurations and are not limited to the sequence of steps as shown in the block diagram of FIG. 7. It is also contemplated that one or more steps of process 400 can be performed individually at different times, depending on equipment availability, configuration, and other such factors. Further, thinner films can be used in process 400, such as films that have a gauge thickness of about ten mils or less, thereby reducing the amount of material or plastic needed to produce display device 100. However, it is contemplated that process 400 can also be used to create display devices with thicker gauges, i.e. greater than about ten mils.

In another embodiment, lens array 102 is formed by embossing inline on a converting station. For example, referring to FIG. 9, a system 900 for producing a thin film dimensional product comprises an unwind station 902 with a web 904 of a polymeric material, such as polypropylene, polyethylene, APET, PVC, or the like. Web 904 can be pre-printed on a first surface 906a with a dimensional image as described supra. In an alternative embodiment, web 902 can comprise a plurality of sheets, rather than a continuous roll.

Web 904 advances from unwind station 902 to one or more converting stations 908. Converting station 908 can comprise, for example, a die punch, rotary die, guillotine, or any of a variety of converting equipment. Web 904 can include an eye mark and converting station 908 can comprise a sensor such that when the sensor senses the eye mark, the advancement of web 904 is halted, and the converting station 908 is activated to convert a portion 910 of web 902 that is positioned within unwind station 902 to the desired design.

System 900 can comprise additional converting stations 908. When portion 910 advances from a first converting station 908a to a second converting station 908b having a sensor, the second converting station 908b senses the eye mark, again halting web 902 such that portion 910 is within second converting station 908b and a second portion 912 of web 902 is within first converting station 908a. Converting stations 908a and 908b are simultaneously activated such that first portion 910 is converted by second converting station 908b, as second portion 912 is converted by first converting station 908a.

System 900 can further comprise a lens embossing station 914. Lens embossing station 914 can comprise, for example, a platen. A lens die 916 is coupled to lens embossing station 914. Lens die 916 can comprise, for example, the negative of the desired lens pattern. As web 902 advances to embossing station 914, a sensor senses the eye mark, and halts web 902 such that portion 910 is within embossing station 914. In an embodiment, embossing station 914 is activated prior to activation of first or second converting stations 908a,b. In another embodiment, embossing station 914 is simultaneously activated with one or more converting stations 908. Heat and pressure is applied such that a second surface 906b is in contact with lens die 916 and is therefore embossed with the desired lens pattern.

Web 902 is then advanced to winding station 918, where web 902 is wound into a roll of embossed, converted product.

One of ordinary skill in the art would recognize that one or more converting stations 908 and one or more embossing stations 914 can be configured in any of a variety of configurations. System 900 is generally configured, however, such that embossing station 914 can be activated before converting stations 908.

The above-mentioned processes also are adapted for spot coating of a lens array, thereby allowing one to selectively created an image display area on portions of the web such that the image display device is selectively positioned on the finished article. For example, an article can have printing over a portion of its exterior. A lens array can be formed over only portions of the printing such that the dimensional image display device is selectively positioned on an article.

The above-mentioned processes, particularly process 400, can also be used in direct food contact applications that otherwise would require overwrapping. For example, the coating in process 400 can be printed over image 104, or a lens array 102 can be laminated over image 104, which buries or protects otherwise migratory materials, such as inks. Display devices 100 can then be used in packaging that is in direct contact with food products, without requiring overwrapping, thereby eliminating additional steps and costs.

In any of the above described processes, lens array 102 interacts with image 104, thereby requiring acceptable ink-to-lens registration accuracy. However, the processes described above do not require the critical ink-to-ink registration accuracy of conventional technologies. Further, the lens array and image interaction of the display device of the invention are different from other known technologies that incorporate a basic background and a lens array that is designed to interact with light which in turn randomly interacts with the background to produce an effect. These techniques do not require ink-to-lens registration accuracy because the image is not mapped to the lenses as in the present invention.

In an embodiment, a display device comprises a first substrate surface presenting a lens array and a second substrate surface presenting a printed image, wherein the first and second substrate surfaces are opposing, the lens array defines a web including a plurality of substantially circular lenses, and an animation of the printed image is tri-directionally viewable through the web.

High definition thin film dimension display device 100 can be used in a variety of applications because of its high degree of flexibility. The flexibility of the thin film dimension display device is determined by a drape test which measures the level of drape of the light steering optical layer or the like. The drape test involves placing the light steering optical layer of display device 100 on a draping tester which is a raised platform with a straight edge. Display device 100 is placed on the platform such that a predetermined portion drapes over an edge of the platform. A protractor is positioned such that the flat side of the protractor is flush with the platform surface, and the measurement arc extends below the platform surface. An angle reading of the protractor is taken at the lowest point of the material. Display devices of embodiments of the present invention have flexibilities of at least about eight degrees when measured from the horizontal surface or platform.

Drape testing was performed on thin film display devices that were manufactured according to at least one embodiment of the present invention. The drape test was performed at 74 degrees Fahrenheit and 43 percent relative humidity. Each sample strip was 3¼ inches by 8¼ inches. Each sample strip was placed on the drape tester platform lens side up with approximately 3 inches of the long edge draping over the platform edge. A display device having a light steering optical layer of about 10 mils had a drape of about eight degrees; a display device having a light steering optical layer of about 5 mils had a drape of about 25-26 degrees.

The invention may be embodied in other specific forms without departing from the essential attributes thereof; therefore, the illustrated embodiments should be considered in all respects as illustrative and not restrictive.

What is claimed is:

1. Flexible packaging for displaying a dimensional image comprising:
    a substrate;
    a lens array, the lens array including a plurality of non-lenticular lenses; and
    a dimensional image layer viewable through the lens array, the dimensional image layer being independent of at least one of ink-to-ink registration accuracy and lens-to-ink registration accuracy,
    wherein the dimensional image layer and the lens array define a light steering optical layer having a thickness of about one to about ten mils.

2. The flexible packaging of claim 1, wherein the lens array comprises a preformed lens material having a first surface including the plurality of non-lenticular lenses, and a flat second surface, and wherein the flat second surface of the lens material is laminated to the substrate.

3. The flexible packaging of claim 2, wherein the dimensional image layer is printed on at least a portion of the flat second surface of the lens material, the substrate, or both.

4. The flexible packaging of claim 1, wherein the substrate comprises a polymeric film, and wherein at least a portion of a first surface of the polymeric film is embossed to form the lens array thereon.

5. The flexible packaging of claim 4, wherein the dimensional image layer is printed on at least a portion of the second surface of the polymeric film opposite the lens array.

6. The flexible packaging of claim 5, further comprising a laminate applied over at least a portion of dimensional image layer.

7. The flexible packaging of claim 1, wherein the lens array comprises a coating applied to a first surface of the substrate, and wherein at least a portion of the coating is patterned to form the plurality of non-lenticular lenses.

8. The flexible packaging of claim 7, wherein the dimensional image layer is printed on the first surface of the substrate before the coating is applied.

9. The flexible packaging of claim 1, the flexible packaging comprising a packaging wrapper, a packing tube, a sticker, or a label.

10. The flexible packaging of claim 1, wherein the plurality of non-lenticular lenses comprises a plurality of fly's eye lenses.

11. The flexible packaging of claim 1, wherein the thickness of the light steering optical layer is from about one to about five mils.

12. A method of making flexible packaging for displaying dimensional images comprising:
    providing a substrate;
    providing a lens array material having a plurality of non-lenticular lenses formed on at least a portion of a first surface;
    printing a dimensional image layer on at least a portion of first surface of the substrate, a second substantially planar surface of the lens array material, or both, the dimensional image layer being independent of at least one of ink-to-ink registration accuracy and lens-to-ink registration accuracy; and
    bonding the first surface of the substrate to the second substantially planar surface of the lens array material,
    wherein the dimensional image layer and the lens array define a light steering optical layer having a thickness of about one to about ten mils.

13. The method of claim 12, wherein the dimensional image layer is printed on at least a portion of the first surface of the substrate, and the lens array material is bonded to the first surface of the substrate having the dimensional image layer thereon.

14. The method of claim 12, wherein the plurality of non-lenticular lenses comprises a plurality of fly's eye lenses.

15. A method of making flexible packaging for displaying dimensional images comprising:
    providing a flexible film;
    applying a dimensional image layer to at least a portion of a first surface of the flexible film, a second surface of the flexible film, or both, the dimensional image layer being independent of at least one of ink-to-ink registration accuracy and lens-to-ink registration accuracy; and
    patterning the second surface of the flexible film to form a lens array on at least a portion of the second surface, the lens array including a plurality of non-lenticular lenses;
    wherein the dimensional image layer and the lens array define a light steering optical layer having a thickness of about one to about ten mils.

16. The method of claim 15, wherein the flexible film comprises a polymeric film, and wherein patterning the second surface of the flexible film includes embossing at least a portion of the second surface to form the lens array.

17. The method of claim 15, wherein patterning the second surface of the substrate comprises:
    applying a coating to at least a portion of the second surface of the flexible film; and
    curing the coating.

18. The method of claim 17, wherein applying a coating comprises:
    printing the coating on at least a portion of the second surface of the flexible film to form the lens array.

19. The method of claim 17, wherein applying a dimensional image layer comprises printing the dimensional image layer on at least a portion of the first surface of the flexible film before application of the coating, after application of the coating, or both.

20. The method of claim 15, wherein the plurality of non-lenticular lenses comprises a plurality of fly's eye lenses.

* * * * *